(12) United States Patent
Rajakarunanayake (10) Patent No.: US 9,408,155 B2
(45) Date of Patent: *Aug. 2, 2016

(54) COORDINATED WIRELESS COMMUNICATION AND POWER DELIVERY

(71) Applicant: Broadcom Corporation, Irvine, CA (US)

(72) Inventor: Yasantha Rajakarunanayake, San Ramon, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/872,586

(22) Filed: Oct. 1, 2015

(65) Prior Publication Data
US 2016/0029319 A1    Jan. 28, 2016

Related U.S. Application Data

(63) Continuation of application No. 13/535,517, filed on Jun. 28, 2012, now Pat. No. 9,185,662.

(51) Int. Cl.
| | |
|---|---|
| *H04M 1/00* | (2006.01) |
| *H04W 52/04* | (2009.01) |
| *H04W 52/26* | (2009.01) |
| *H04B 17/10* | (2015.01) |
| *H02J 7/02* | (2016.01) |
| *H02J 7/04* | (2006.01) |
| *H04B 5/00* | (2006.01) |
| *H04W 52/02* | (2009.01) |
| *H04W 52/28* | (2009.01) |

(52) U.S. Cl.
CPC ............ *H04W 52/04* (2013.01); *H02J 7/025* (2013.01); *H02J 7/04* (2013.01); *H04B 5/0037* (2013.01); *H04B 17/102* (2015.01); *H04W 52/0261* (2013.01); *H04W 52/265* (2013.01); *H04W 52/288* (2013.01)

(58) Field of Classification Search
CPC ... H04W 52/04; H04B 17/102; H04B 5/0037; H04J 7/025
USPC .......................................... 455/573; 370/318
See application file for complete search history.

(56) References Cited

U.S. PATENT DOCUMENTS

| | | | |
|---|---|---|---|
| 8,194,583 B2 * | 6/2012 | Zhu ..................... | H02J 17/00 370/318 |
| 8,199,004 B1 | 6/2012 | Crooks | |
| 2011/0193417 A1 | 8/2011 | Hirasaka et al. | |
| 2012/0207023 A1 * | 8/2012 | Tsuda .................. | H04W 48/06 370/235 |
| 2013/0234536 A1 | 9/2013 | Chemishkian et al. | |
| 2014/0004912 A1 | 1/2014 | Rajakarunanayake | |

* cited by examiner

*Primary Examiner* — Marcos Batista
(74) *Attorney, Agent, or Firm* — Sterne, Kessler, Goldstein & Fox PLLC (57) ABSTRACT

The present disclosure is directed to a method, apparatus, and system for managing wireless communications between wireless devices, including providing radiative power delivery to the wireless devices. The wireless devices may include a communication transceiver to wireless communicate with other wireless devices and a radiative power harvester to receive radiative power transmissions from the other wireless devices. The wireless devices may also include a switching unit to selectively provide a connection to the communication transceiver and the wireless power harvester based on the mode of operation of the wireless devices.

20 Claims, 8 Drawing Sheets

COORDINATED WIRELESS COMMUNICATION AND POWER DELIVERY

RELATED APPLICATIONS

This application is a continuation of U.S. patent application Ser. No. 13/535,517, filed Jun. 28, 2012, now U.S. Pat. No. 9,185,662, the entire contents of which are incorporated by reference herein.

FIELD

This application relates generally to wireless communication and radiative power delivery and, more particularly to the management of a communication band for wireless communication and radiative power delivery.

BACKGROUND

Wireless communication devices communicate with one or more other wireless communication devices or wireless access points to send and receive data. Typically, a first wireless communication device generates and transmits a radio frequency signal modulated with encoded information. This radio frequency signal is transmitted into a wireless environment and is received by a second wireless communication device. The second wireless communication device demodulates and decodes the received signal to obtain the information. The second wireless communication device may then respond in a similar manner. The wireless communication devices can communicate with each other or with access points using any well-known modulation scheme, including: amplitude modulation (AM), frequency modulation (FM), quadrature amplitude modulation (QAM), phase shift keying (PSK), quadrature phase shift keying (QPSK), and/or orthogonal frequency-division multiplexing (OFDM), as well as any other communication scheme that is now, or will be, known.

Many wireless communication devices, both mobile and stationary, operate on batteries having limited capacities. Consequently, these wireless communication devices require routine charging from traditional electrical power sources.

SUMMARY

A method, apparatus, and system for managing wireless communications, including radiative power delivery, between battery-powered wireless devices, substantially as shown in and/or described in connection with at least one of the figures, as set forth more completely in the claims.

These and other advantages, aspects and novel features of the disclosure, as well as details of exemplary embodiments thereof, will be more fully understood from the following description and drawings.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

The present disclosure is directed to a method, apparatus, and system for managing wireless communications between wireless devices, including providing radiative power delivery to the wireless devices, while at the same time reducing the frequency of required charging of any power storage device contained therein using traditional electrical power sources, and the drawbacks associated therewith. In particular, in managing the wireless communications, the various wireless devices within a communication environment may coordinate with one another to establish periods in which the various devices will cooperatively engage in a radiative power delivery sequence. For example, as discussed in more detail below, a first and second wireless communication device may exchange communications with one another to coordinate a time period where the first device will provide radiative power to the second device. Further, in addition to coordinating radiative power delivery, and as discussed in more detail below, the present disclosure contemplates, among other things, adjusting the transmission frequency of the radiative power, the transmission power of the radiative power, and the time period at which radiative power delivery is performed.

Figure 1:
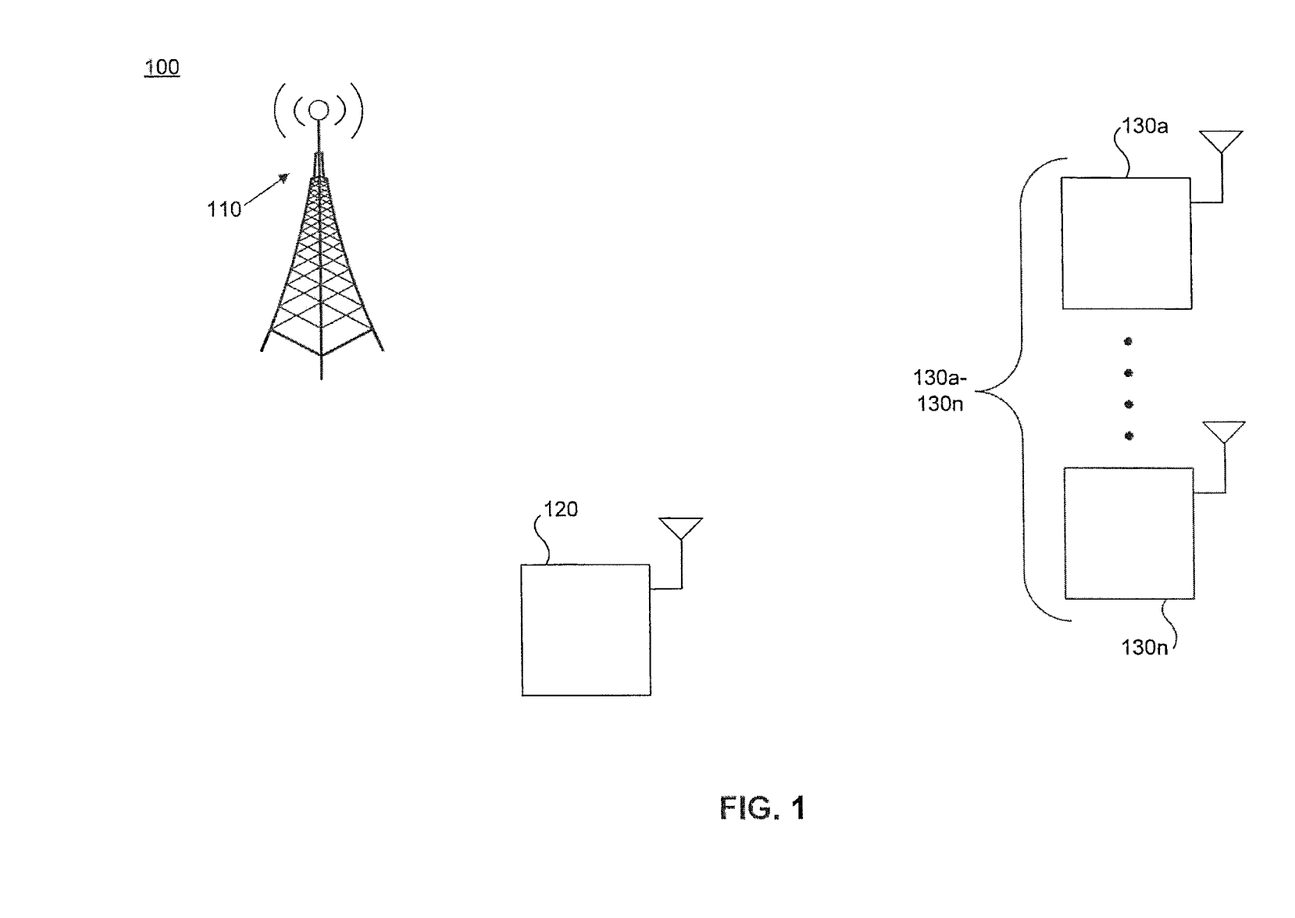
FIG. 1 illustrates an exemplary wireless communication environment.

FIG. 1 illustrates an exemplary communication environment 100. The wireless communication environment 100 provides wireless communication of information, such as one or more commands and/or data, between wireless communication devices. The wireless communication devices may each be implemented as a standalone or a discrete device, such as a mobile telephone or mobile telephone peripheral device (e.g., Bluetooth headset), or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the present disclosure.

The exemplary wireless communication environment 100 includes a first wireless communication device 110 and a second wireless communication device 120. The wireless communication device 110 and the wireless communication device 120 are each capable of both wireless transmission and wireless reception utilizing one or more various wireless communication protocols, such as Wi-Fi (IEEE 802.11), Bluetooth, Near-field Communication (NFC) (ISO/IEC 18092), WiMax (IEEE 802.16), ZigBee (IEEE 802.15.4), or one or more various cellular protocols specified in the International Mobile Telecomunnications-2000 (IMT-2000) standard, developed by the 3rd generation partnership project (3GPP), and/or developed by the $3^{rd}$ generation partnership project 2 (3GPP2). Although the exemplary discussion of the wireless communication environment 100 describes the first wireless communication device 110 and second wireless communication device 120, the wireless communication environment 100 is not limited thereto, and may include other wireless communication devices 130a-130n. For example, wireless communication devices 110 and 130a may supply radiative power to wireless communication device 120. Further, the various wireless communication devices within the wireless communication environment 100 may utilize beam forming during wireless transmissions.

For purposes of this discussion, the wireless communication environment 100 may represent an exemplary embodiment of a wireless local area network (WLAN), the first wireless communication device 110 may represent an exemplary embodiment of a wireless access point (WAP), and the second wireless communication device 120 may represent an exemplary embodiment of a mobile device. Although the first wireless communication device 110 is described for exemplary purposes as a WAP, the first wireless communication device 110 is not limited thereto, and may be another mobile device operating on direct current (DC) power and/or alternating current (AC) power. Similarly, the wireless communication environment is not limited to WLAN environments and may include wide area networks (WAN).

In an exemplary embodiment of the present disclosure, the first wireless communication device 110 and the second wireless communication device 120 may coordinate with one another to establish a radiative power delivery sequence that includes at least one time period in which the first and second wireless communication devices (110, 120) cooperatively engage in a radiative power delivery process. For example, and as discussed in more detail below, the first wireless communication device 110 and second wireless communication device 120 may exchange communications with one another to coordinate at least one time period where the first device will provide radiative power to the second device. During the time period(s), and relying on the predetermined radiative power delivery sequence, the second device may be configured to receive and effectively utilize the radiative power.

Figure 2:
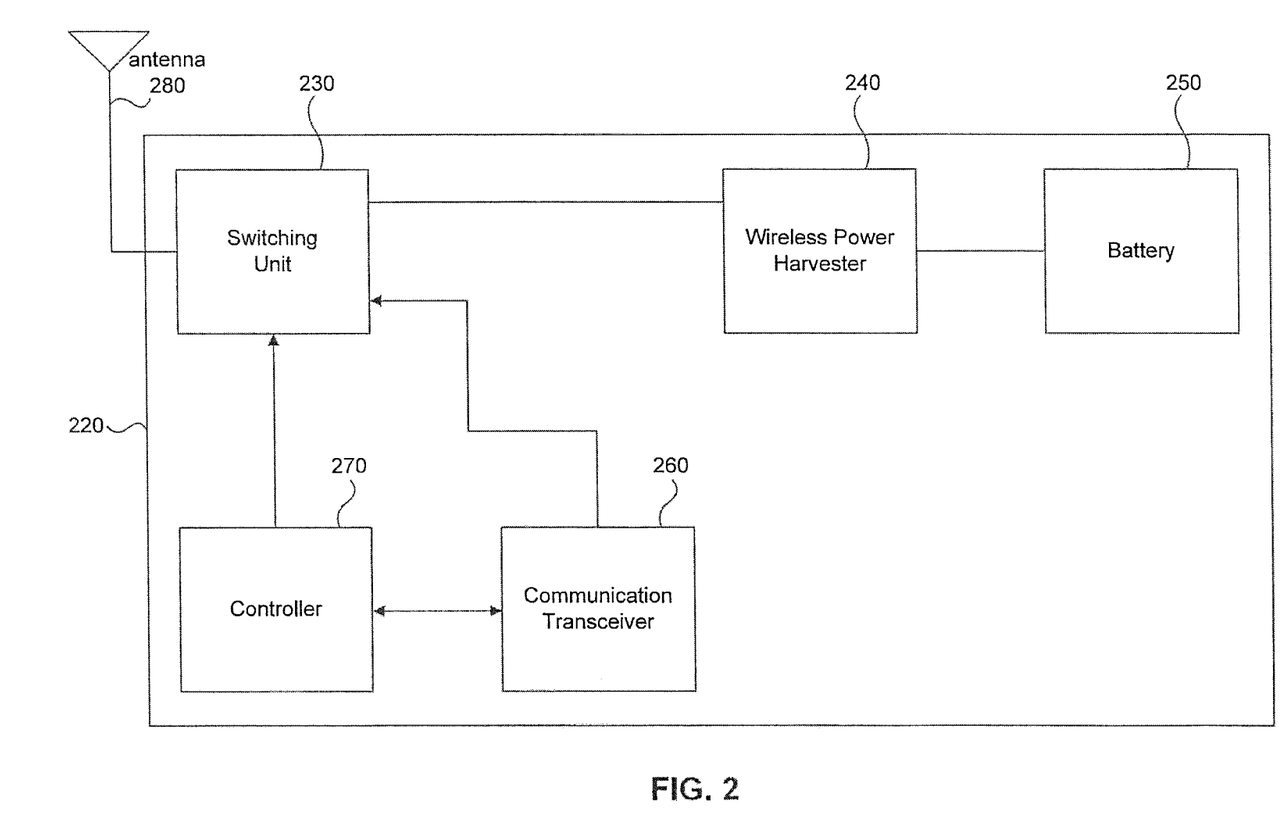
FIG. 2 illustrates a block diagram of an exemplary wireless communication device in accordance with an exemplary embodiment of the present disclosure.

FIG. 2 illustrates a block diagram of a wireless communication device 220 in an exemplary embodiment of the disclosure, and that may be implemented within the wireless communication environment 100 of FIG. 1. The wireless communication device 220 includes a switching unit 230, a wireless power harvester 240, a battery 250, a communication transceiver 260, a controller 270, and antenna 280. Although a single antenna 280 is described, the embodiment is not limited to single antenna configurations and may include two or more antennas in a Multiple-Input Multiple-Output (MIMO) configuration. Further, in another embodiment, the single antenna 280 may be an array of antennas having beam steering capability, as will be understood by those skilled in the art.

The switching unit 230 selectively connects the antenna 280 to either the wireless power harvester 240 or the communication transceiver 260 based on the mode of operation of the wireless communication device 220. The wireless communication device 220 is configured to operate in either a communication mode or a wireless power transfer (WPT) mode. When operating in the communication mode, the switching unit 230 connects to the communication transceiver 260, thereby connecting the antenna 280 to the communication transceiver 260 via the switching unit 230. Conversely, when operating in the WPT mode, the switching unit 230 connects to the wireless power harvester 240, thereby connecting the antenna 280 to the wireless power harvester 240 via the switching unit 230. In operation, the switching unit 230 may switch between the WPT mode and the communication mode based on a radiative power transfer sequence previously established between the wireless communication device 220 and at least one other wireless communication device (e.g., wireless communication device 110 of FIG. 1).

In another exemplary embodiment of the disclosure, the wireless communication device 220 can include a separate antenna to be used during the wireless power transfer (WPT) mode and an antenna (e.g., antenna 280) to be used during the communication mode. In this case, during the WPT mode, the switching unit 230 can connect the WPT mode antenna to the wireless power harvester 240 while disconnecting the communication mode antenna from the communication transceiver 260. Similarly, during the communication mode, the switching unit 230 can connect the communication mode antenna to the communication transceiver 260 while disconnecting the WPT mode antenna from the wireless power harvester 240. In order to do so, the switching unit may include two or more switches to effect the switching between the two antennas and the power harvester 240 and the communications transceiver 260.

During the WPT mode, the wirelessly communicated information received by the wireless communication device 220 may be transmitted to the wireless communication device 220 at a higher transmission power than a transmission power while operating in the communication mode. For example, wirelessly communicated information utilizing one or more of the various wireless communication protocols discussed above generally have a maximum transmission power of 1 W (30 dBm). Conversely, when operating in the WPT mode, the wirelessly communicated information may have a transmission power of, for example, 1 KW (60 dBm). In particular, because the various wireless communication devices are not operating in a communication mode during the WPT process (i.e., the communication transceiver 260 is disconnected from the antenna 280 during the WPT mode), the transmission power may exceed regulatory limits of transmission power that typically govern the various communication protocols. For example, regulatory mode switching can be achieved by adjusting the transmission power based on the operating mode of the wireless device 220. For the purpose of this discussion, the wirelessly communicated information transmitted/received during the WPT mode may be referred to as radiative power.

The increase in transmission power may be set forth in a predetermined radiative power transfer sequence established between the wireless communication device 220 and at least one other wireless communication device (e.g., wireless communication device 110 of FIG. 1). For example, because the various wireless communication devices have cooperatively established the radiative power transfer sequence, the wireless communication devices have established the time period(s) and the transmission power at which the radiative power will be provided by the other wireless communication device(s).

Similarly, the frequency at which wirelessly communicated information is transmitted between the wireless communication device 220 and at least one other wireless communication device within the wireless communication environment 100 can depend on the operating mode of the wireless communication device 220.

For example, during the WPT mode, the wirelessly communicated information (i.e., radiative power) may be transmitted to the wireless communication device 220 at a higher transmission frequency than the transmission frequency of wirelessly communicated information while operating in the communication mode. However, the relationship between the transmission frequency and operational mode is not limited to the above example, and the transmission frequency may be higher when operating in, for example, the communication mode. Moreover, the transmission frequency of the wirelessly communicated information during the various modes may be the same.

Similar to the transmission power, the transmission frequency may be set forth in the predetermined radiative power transfer sequence established between the wireless communication device 220 and at least one other wireless communication device. In this case, by establishing the radiative power transfer sequence, the wireless communication devices have established the transmission frequency, as well as the time period(s) and the transmission power, at which the radiative power will be provided by the other wireless communication device(s).

The communication transceiver 260 includes suitable logic, circuitry, and/or code that may be configured to wirelessly transmit and/or receive information, such as one or more commands and/or data.

The controller 270 is connected to both the switching unit 230 and the communication transceiver 260, and includes suitable logic, circuitry, and/or code that may be configured to instruct the switching unit 232 to selectively connect to either the wireless power harvester 240 or the communication transceiver 260, and to instruct the communication transceiver 260 to wirelessly transmit and/or receive information.

Figure 3A:
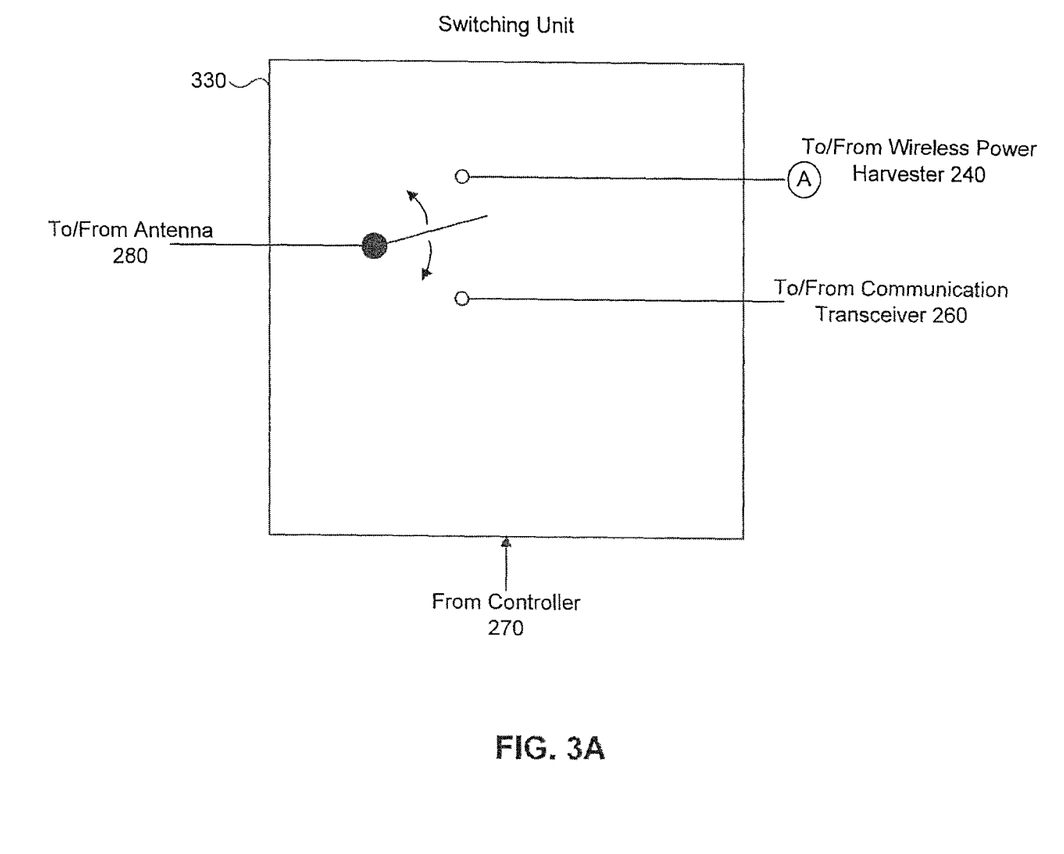
FIG. 3a illustrates a block diagram of an exemplary switching unit in accordance with an exemplary embodiment of the present disclosure.

FIG. 3a illustrates a block diagram of a switching unit 330 in an exemplary embodiment of the present disclosure, and that may be implemented within the wireless communication device 220 of FIG. 2. The switching unit 330 includes suitable logic, circuitry, and/or code that may be configured to selectively connect an antenna (e.g., antenna 280 of FIG. 2) to either a wireless power harvester (e.g., wireless power harvester 240 of FIG. 2) or a communication transceiver (e.g., communication transceiver 260 of FIG. 2). Further, the switching unit 330 receives an input from a controller (e.g., controller 270 of FIG. 2) indicating the current operating mode of the wireless communication device (e.g., wireless communication device 220 of FIG. 2) to facilitate the selective connections discussed above.

Figure 3B:
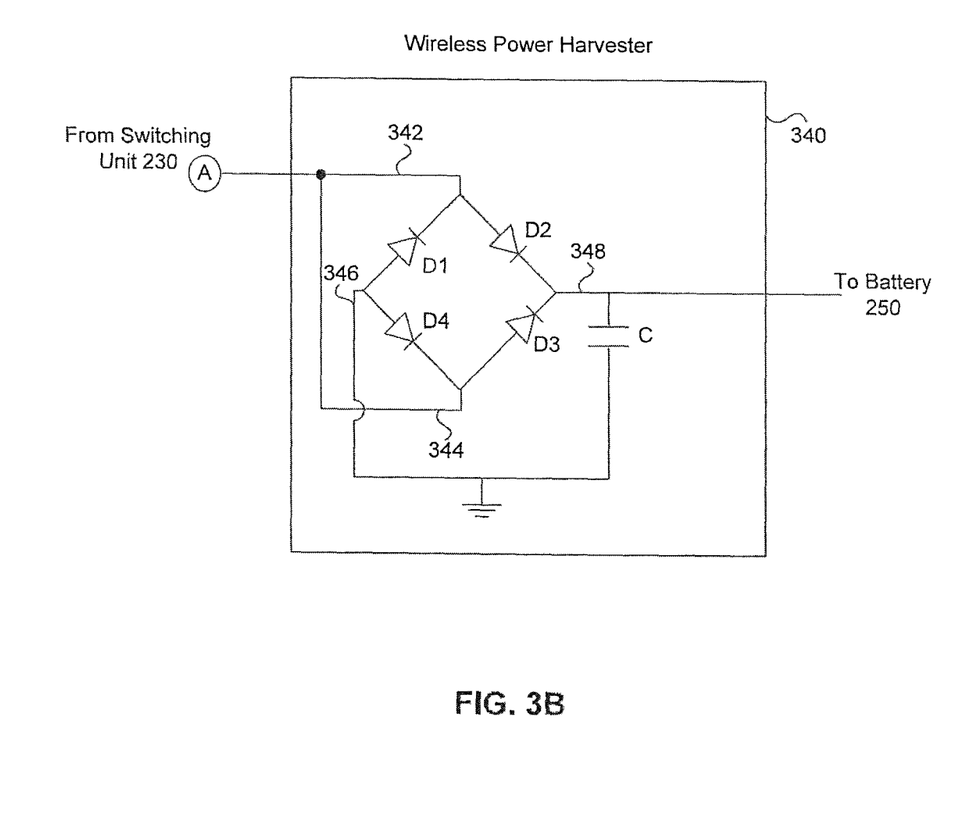
FIG. 3b illustrates a block diagram of an exemplary wireless power harvester in accordance with an exemplary embodiment of the present disclosure.

FIG. 3b illustrates a block diagram of a wireless power harvester 340 in an exemplary embodiment of the present disclosure, and that may be implemented within the wireless communication device 220 of FIG. 2. The wireless power harvester 340 may be connected to one of the outputs of a switching unit (e.g., switching unit 230 of FIG. 2). In an exemplary implementation within the wireless communication device 220 operating in a WPT mode, the wireless power harvester 340 may be connected to the antenna 280 via the switching unit 230.

With continued reference to FIG. 3b, the wireless power harvester 340 includes suitable logic, circuitry, and/or code that may be configured to receive communicated information from an antenna (e.g., antenna 280 of FIG. 2) through a switching unit (e.g., switching unit 230 of FIG. 2). The wireless power harvester may also be configured to convert the received information.

The wireless power harvester 340 may include a full-wave rectifier made up of, for example, four semiconductor diodes (D1-D4) in a diode bridge configuration. The full-wave rectifier may convert the wirelessly communicated information received by the wireless power harvester (e.g., from the switching unit 230 of FIG. 2) into a direct current (DC) charge. The full-wave rectifier includes two inputs (342, 344) that may serve as the input to the wireless power harvester 340. That is, the two inputs of the full-wave rectifier (342, 344) may be connected to the output of the switching unit (e.g., switching unit 230 of FIG. 2). The full-wave rectifier includes two outputs (346, 348); the first (346) may be connected to ground, while the second (348) may be connected to the output of the wireless power harvester 340. The wireless power harvester 340 may also include a capacitor (C) electrically connected in parallel between the second output (348) of the full-wave rectifier and ground. The capacitor may serve as a smoothing circuit or filter to reduce an alternating current (AC) ripple voltage component that may be present at the output of the wireless power harvester 340.

With continued reference to FIG. 3b, the output of the wireless power harvester 340 may be connected to a battery (e.g., battery 250 of FIG. 2). The battery may be configured to store DC charge (e.g., measured as voltage and current) and may serve as a power source for the wireless communication device 220.

Figure 3C:
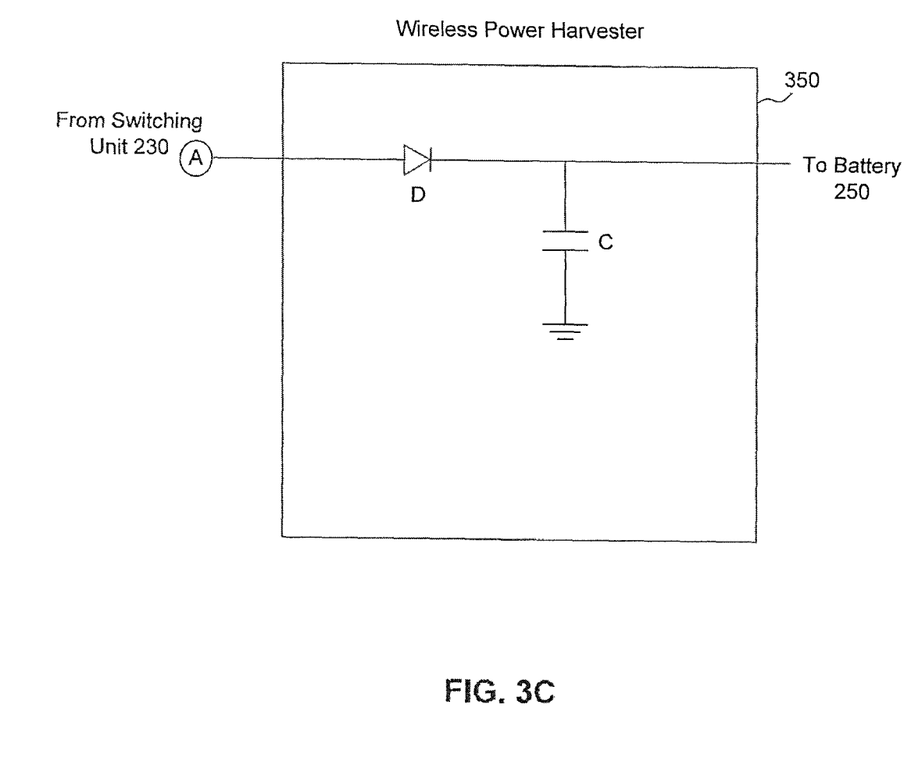
FIG. 3c illustrates a block diagram of an exemplary wireless power harvester in accordance with an exemplary embodiment of the present disclosure.

FIG. 3c illustrates a block diagram of a wireless power harvester 350 in an exemplary embodiment of the present disclosure, and that may be implemented within the wireless communication device 220 of FIG. 2. The wireless power harvester 350 may be connected to one of the outputs of a switching unit (e.g., switching unit 230 of FIG. 2). In an exemplary implementation within the wireless communication device 220 operating in a WPT mode, the wireless power harvester 350 may be connected to the antenna 280 via the switching unit 230.

The wireless power harvester 350 may include a half-wave rectifier made up of, for example, one semiconductor diode (D). The half-wave rectifier may convert the wirelessly communicated information received by the wireless power harvester into a DC charge. The half-wave rectifier includes an input (e.g., the input of the semiconductor diode) that may serve as the input to the wireless power harvester 350. The output of the semiconductor diode may be connected to the output of the wireless power harvester 350. The wireless power harvester 350 may also include a capacitor (C) electrically connected in parallel between the output of the semiconductor diode and ground. The capacitor may serve as a smoothing circuit or filter to reduce an AC ripple voltage component that may be present at the output of the wireless power harvester 350.

With continued reference to FIG. 3*c*, the output of the wireless power harvester 350 may be connected to a battery. The battery may be configured to store DC charge, and may serve as a power source for the wireless communication device 220.

For the purpose of this discussion, the operation of a wireless communication device within the wireless communication environment will be discussed with reference to the wireless communication device 220 of FIG. 2 implemented in the wireless communication environment 100 of FIG. 1. In operation, the wireless communication device 220 may determine whether to enter a WPT mode so as to enable the wireless communication device 220 to wirelessly receive radiative power from at least one other wireless communication device within the wireless communication environment 100. For example, the wireless communication device 220 may wirelessly receive power from the first wireless communication device 110 of FIG. 1. As discussed above, the time period(s) in which the wireless communication device 220 receives radiative power from the first wireless device 110, the transmission power of the radiative power, and/or the transmission frequency of the radiative power may be established between the wireless communication device 220 and the first wireless communication device 110 by coordinating a radiative power delivery sequence prior to the power transfer.

The wirelessly received power may be used to power the wireless communication device 220, and/or may be stored within the battery 250 of the wireless communication device 220.

In an exemplary embodiment of the present disclosure, the controller 270 of the wireless communication device 220 may control the wireless communication device 220 to enter the WPT mode. In operation, and as illustrated in FIG. 3*a*, the controller 270 controls the switching unit 230 to disconnect the antenna 280 from the communication transceiver 260 and to then connect the antenna 280 to the wireless power harvester 240.

In an exemplary embodiment of the present disclosure, the wireless communication device 220 may enter the WPT mode while the wireless communication device 220 is operating in a sleep mode.

A sleep mode refers to a low power operating state in which electrical consumption of the device is reduced compared to, for example, a normal (full) and/or idle operating state. When placed in sleep mode, the wireless communication device 220 may cut power to some or all unneeded components of the wireless communication device 220, except such components configured to recognize a wake-up event to thereby transition the wireless communication device 220 from sleep mode to an idle or normal operating state.

In an exemplary embodiment of the present disclosure, the controller 270 may control the communication transceiver 260 to transmit a WPT mode notification to at least one wireless communication device within the wireless communication environment 100. The WPT mode notification notifies the other wireless communication device(s) of its intention to enter the WPT mode. Upon receipt of the WPT mode notification by the other wireless communication device(s), the wireless communication device 220 and at least one other wireless communication device may coordinate with one another to cooperatively establish a radiative power delivery sequence. The radiative power delivery sequence may include at least one predetermined time period in which, for example, the other wireless communication device(s) will provide radiative power to the wireless communication device 220. For example, the radiative power delivery sequence may establish at least one time period in which the wireless communication device 220 may wirelessly receive power from the first wireless communication device 110 of FIG. 1. The radiative power delivery sequence may also establish the transmission power and/or the transmission frequency at which the radiative power is transmitted.

The WPT mode notification may include a time of entry into the WPT mode as well as a duration in which the wireless communication device 220 will operate in the WPT mode. For example, the WPT mode notification may include at least one time at which the wireless communication device 220 will enter the WPT mode and at least one corresponding duration in which the wireless communication device 220 will operate in the WPT mode. Further, in an exemplary embodiment where the wireless communication device 220 enters the WPT mode while operating in a sleep mode, the time of entry and duration may refer to the time period at which the wireless communication device 220 will operate in the sleep mode.

In another exemplary embodiment, one or more wireless communication devices within the wireless communication environment 100 may broadcast, unicast, multicast, and/or anycast a notification to one or more other wireless communication devices within the wireless communication environment 100 indicating that the one or more wireless communication devices may transmit radiative power to one or more of the other wireless communication devices.

For example, referring to FIG. 1, the wireless communication device 110 may transmit a WPT broadcast that may be received by the wireless communication device 120. The WPT broadcast may be similar to the WPT mode notification in that it may convey to any receiving wireless communication device the wireless communication device's 110 availability in supplying radiative power. For the purpose of this discussion, the WPT broadcast may refer to a broadcast, unicast, multicast, and/or anycast of the notification to the one or more other wireless communication devices.

The WPT broadcast may include one or more times and corresponding durations in which the broadcasting device (e.g., wireless communication device 110) may supply radiative power. Additionally, the WPT broadcast may include a transmission frequency in which the wireless communication device 110 transmits radiative power.

In response to receiving the WPT broadcast, the wireless communication device 120 may transmit the WPT mode notification to the wireless communication device 110, thereby establishing a radiative power delivery sequence between the wireless communications devices 110 and 120. The radiative power delivery sequence may be referred to as a WPT sequence.

In an exemplary embodiment of the present disclosure, the WPT broadcast may instruct one or more other wireless communication devices within the wireless communication environment 100 to enter the WPT mode. For example, wireless communication device 110 may transmit the WPT broadcast to instruct a receiving device, for example, wireless communication device 120, to enter the WPT mode for a time period specified in the WPT broadcast. In this case, the wireless communication device (e.g., the radiative power supplying device) may control one or more other wireless communication devices to receive radiative power.

Further, in an exemplary embodiment where the wireless communication device 120 enters the WPT mode while operating in a sleep mode, the specified time period may refer to the time period at which the wireless communication device 110 has instructed the wireless communication device 120 to operate in the sleep mode.

In an exemplary embodiment of the present disclosure, the times of entry into the WPT mode and/or the times of corresponding durations in which the wireless communication device will operate in the WPT mode may be determined based on one or more operating conditions of one or more wireless communication devices within the wireless communication environment 100. Similarly, the times and durations in which a wireless communication device may supply radiative power may also be based on one or more operating conditions of the wireless communication device supplying the radiative power.

The operating conditions may include, for example, one or more of: the current date and/or time, the quality of service (QOS) of one or more wireless communication devices, the remaining ampere-hours (Ah) and/or milliampere-hours (mAh) of a battery at a particular voltage within one or more wireless communication devices, and/or the remaining Watt hours (W·h) and/or milliwatt hours (mW·h) of the battery, and the connectivity status of a primary/alternative power source of one or more wireless communication devices.

For example, a time of entry into the WPT mode and/or the corresponding duration in which the wireless communication device operates in the WPT mode may be determined in response to the remaining amp-hours of the battery 250 falling below a predetermined threshold.

In a similar example, a wireless communication device (currently operating on, for example, battery power) may transmit a WPT broadcast in response to the wireless communication device being connected to a primary/alternative power source. For example, the wireless communication device may transmit the WPT broadcast in response to the wireless communication device being connected to, for example, an AC power source. Following receipt of the WPT broadcast by a wireless communication device (e.g., the wireless communication device 220), the wireless communication device 220 may transmit a WPT mode notification to establish a radiative power delivery sequence between the various devices.

In an exemplary embodiment in which the WPT mode notification includes two or more times of entry and two or more corresponding durations, the WPT mode notification may provide a specified sequence (e.g., the radiative power delivery sequence) in which the wireless communicated device 220 is to operate in the WPT mode. That is, the WPT mode notification may include two or more occurrences at which the wireless communication device 220 is to operate in the WPT mode, as well as the durations of such occurrences and the durations between sequential occurrences.

In an exemplary embodiment of the present disclosure, the controller 270 of the wireless communication device 220 may adjust the number of occurrences, the corresponding duration of each occurrence, and/or the duration between sequential occurrences (i.e., the WPT mode sequence).

Further, the controller 270 may modify the WPT mode sequence (e.g., the radiative power delivery sequence) based on one or more operating conditions as discussed above. For example, the WPT mode sequence may be adjusted to increase the frequency, and/or duration, of occurrences in which the wireless communication device 220 operates in the WPT mode if the remaining amp-hours of the battery 250 fall below a predetermined threshold. Alternatively, the WPT mode sequence may be adjusted to decrease the frequency, and/or duration, of occurrences if a higher QOS is desired for the wireless communication device 220.

In an exemplary embodiment of the present disclosure, the WPT mode notification may include information specifying the transmission frequency at which the radiative power is wirelessly transmitted during the WPT mode. Further, the transmission frequency of the radiative power may be different or the same as a transmission frequency at which the wirelessly communicated information is transmitted during the communication mode.

For example, during the WPT mode, the wirelessly communicated information (i.e., radiative power) may be transmitted to the wireless communication device 220 at a higher transmission frequency than the transmission frequency of wirelessly communicated information while operating in the communication mode. In contrast, the transmission frequency may be higher when operating in the communication mode or the transmission frequency of the wirelessly communicated information during the communication mode may be the same as the radiative power transmitted during the WPT mode. As discussed above, the transmission frequency may be established by coordinating a radiative power delivery sequence prior to the power transfer.

In an exemplary embodiment of the present disclosure, the transmission of the WPT mode notification and/or the WPT broadcast may be transmitted utilizing a different wireless communication protocol than the wireless communication protocol used to transmit the radiative power during the WPT mode.

For example, the WPT mode notification and/or the WPT broadcast may be transmitted using Bluetooth, while the radiative power may be transmitted using Wi-Fi. In contrast, both the WPT mode notification/broadcast and the radiative power transmission may utilize the same protocol.

In an exemplary embodiment of the present disclosure, the WPT broadcast may be encrypted utilizing any of the various conventional encryption processes. A WPT key may be provided to select wireless communication devices, thereby providing these devices the ability to decrypt and utilize the WPT broadcast. That is, the encryption of the WPT broadcast provides the ability control which wireless communication devices within the wireless communication environment will have the ability to effectively utilize the radiative power transmitted from the broadcasting wireless communication device. For example, by encrypting the WPT broadcast, only selected wireless communication devices may coordinate with the broadcasting device so as to effectively utilize the transmitted radiative power.

Moreover, the utilization of a WPT key may provide an environment in which a fee is required for the ability to effective utilize the radiative power transmissions. For example, users of devices within a wireless communication environment may be provided with the WPT key in exchange for a monetary fee, thereby allowing for such users to utilize the radiative power transmissions.

In an exemplary embodiment of the present disclosure, wireless communication devices of the wireless communication environment may employ code division multiple access (CDMA) as a communication channel access method. In this case, CDMA may be used to control access to the transmitted radiative power similar to the exemplary embodiment utilizing the WPT key.

Figure 4:
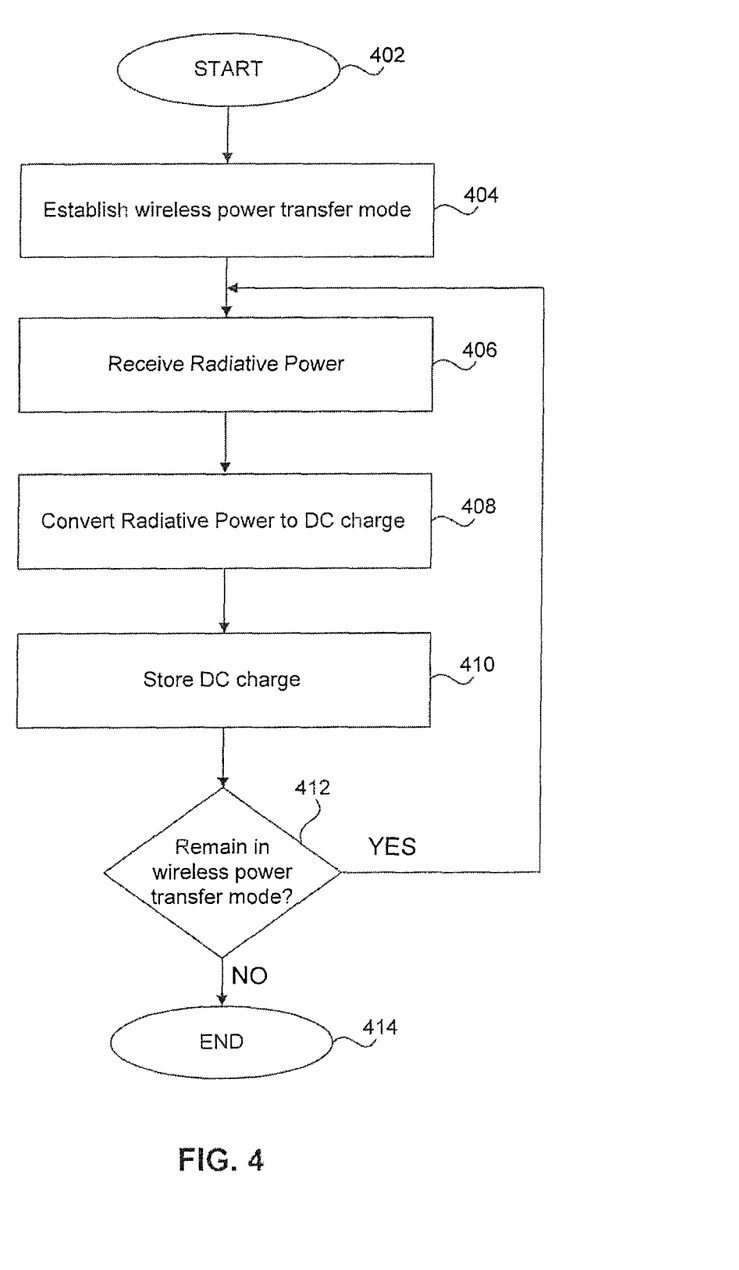
FIG. 4 illustrates a flowchart of a method to wirelessly transfer power to a wireless communication device in accordance with an exemplary embodiment of the present disclosure.

Referring now to FIG. 4, a flowchart 400 of a method to wirelessly transfer power to a wireless communication device in accordance with embodiments of the present disclosure is illustrated. The method of flowchart 400 is described with continued reference to the wireless communication device 220 of FIG. 2. However, it should be noted that the method can be implemented by other wireless communication devices, such as the wireless communication devices 120 and 130a-130n illustrated in FIG. 1.

The method of flowchart 400 begins at step 402 and transitions to step 404. At step 404, the WPT mode operation is established between the wireless communication device 220 and at least one other wireless communication device within the wireless communication environment 100 (e.g., wireless communication device 110).

After step 404, the flowchart 400 transitions to step 406, where the wireless communication device 220 receives radiative power transmitted from at least one other wireless communication device within the wireless communication environment 100. In an exemplary embodiment of the present disclosure, the radiative power is received by the wireless power harvester 240.

After step 406, the flowchart 400 transitions to step 408, where the wireless communication device 220 converts the received radiative power into a DC charge. In an exemplary embodiment of the present disclosure, the radiative power is converted by the wireless power harvester 240.

After step 408, the flowchart 400 transitions to step 410, where the wireless communication device 220 stores the DC charge converted from the received radiative power. In an exemplary embodiment of the present disclosure, the DC charge is stored by the battery 250.

After step 410, the flowchart 400 transitions to step 412, where the wireless communication device 220 determines whether to remain in the WPT mode or to return to the communication mode. In an exemplary embodiment of the present disclosure, the controller 270 may determine whether to control wireless communication device 220 to return to the communication mode.

For example, the controller 270 may control the wireless communication device 220 to switch between the modes of operation based on the WPT mode sequence established between the wireless communication device 220 and at least one other wireless communication device. Similarly, the controller 270 may control the operational modes of the wireless communication device 220 consistent with the WPT notification provided by the wireless communication device 220.

If it is determined at step 412 that the wireless communication device 220 will remain in the WPT mode, the flowchart 400 transitions to step 406. Otherwise, the flowchart 400 transitions to step 414, where the flowchart 400 ends.

Figure 5:
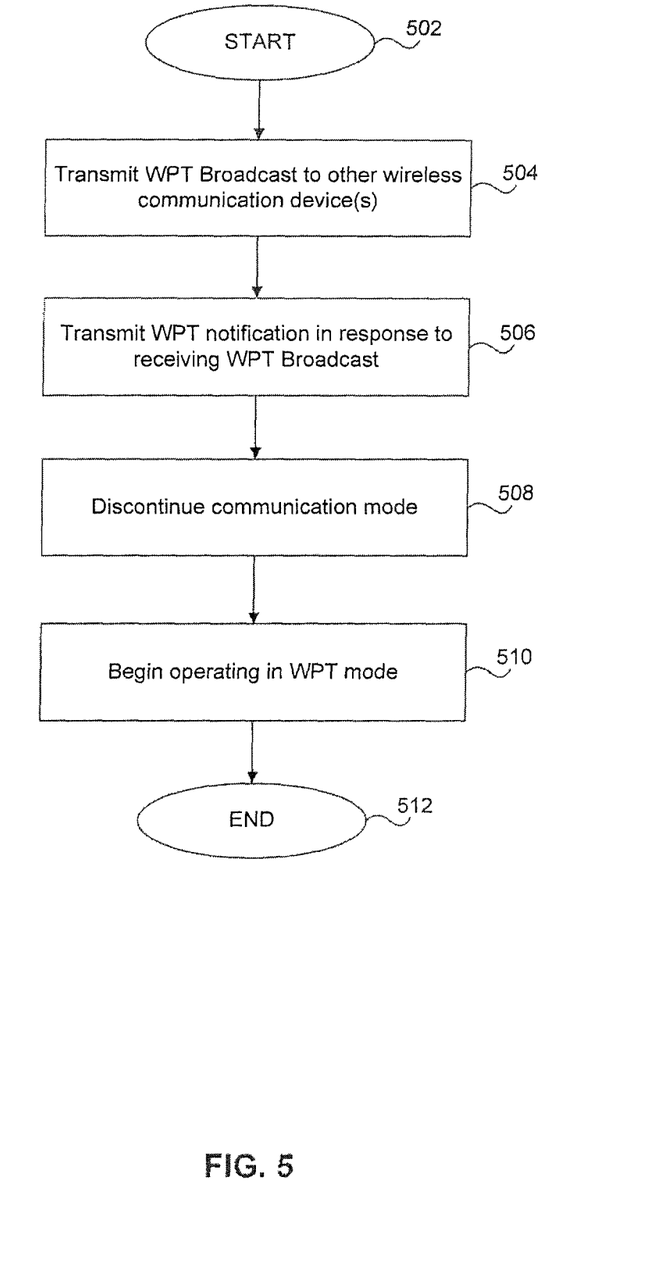
FIG. 5 illustrates a flowchart of method to establish a wireless power transfer mode in accordance with an exemplary embodiment of the present disclosure.

Referring now to FIG. 5, a flowchart 500 of a method to establish a WPT mode in accordance with an embodiment of the present disclosure is illustrated. The method of flowchart 500 is described with continued reference to the method illustrated in FIG. 4 and the wireless communication device 220 of FIG. 2. In particular, the method of flowchart 500 describes the establishment the WPT mode similar to step 404 of flowchart 400 in FIG. 4.

The method of flowchart 500 begins at step 502 and transitions to step 504. At step 504, one or more wireless communication devices (e.g., wireless communication device 110) within the wireless communication environment 100 transmit a WPT broadcast.

After step 504, the flowchart 500 transitions to step 506, where the wireless communication device 220 notifies, upon receipt of one or more WPT broadcasts, the one or more corresponding wireless communication devices of its intention to enter the WPT mode by transmitting WPT mode notifications to the other wireless communication devices associated with the received one or more WPT broadcasts.

After step 506, the flowchart 500 transitions to step 508, where the wireless communication device 220 stops operating in the communication mode. In an exemplary embodiment of the present disclosure, the controller 270 controls the switching unit 230 to disconnect the antenna 280 from the communication transceiver 260.

After step 508, the flowchart 500 transitions to step 510, where the wireless communication device 220 begins operating in the WPT mode. In an exemplary embodiment of the present disclosure, the controller 270 controls the switching unit 230 to connect the antenna 280 to the wireless power harvester 240.

After step 510, the flowchart 500 transitions to step 512, where the flowchart 500 ends.

Figure 6:
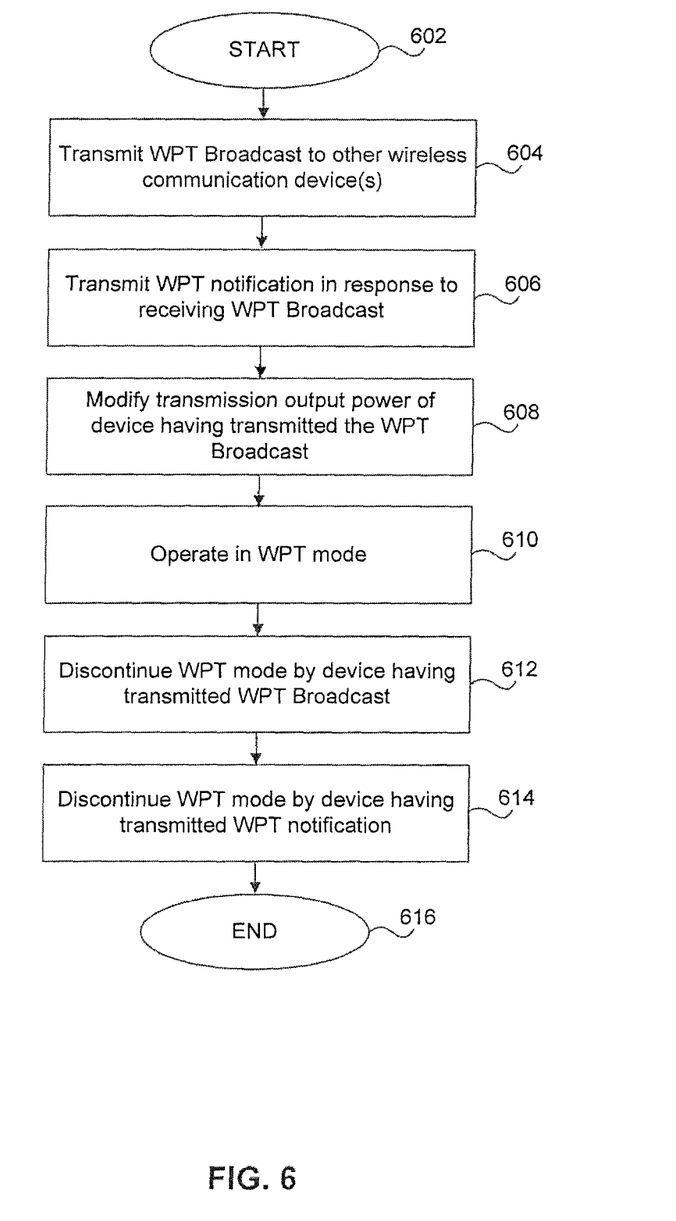
FIG. 6 illustrates a flowchart of method to wirelessly transfer power to a wireless communication device in accordance with an exemplary embodiment of the present disclosure.

Referring now to FIG. 6, a flowchart 600 of a method to wirelessly transfer power to a wireless communication device in accordance with an embodiment of the present disclosure is illustrated. The method of flowchart 600 is described with reference to the wireless communication devices 110 and 120 of FIG. 1. However, it should be noted that the method can be implemented by other wireless communication devices, such as the wireless communication devices 130a-130n illustrated in FIG. 1.

The method of flowchart 600 begins at step 602 and transitions to step 604. At step 604, one or more wireless communication devices (e.g., wireless communication device 110) within the wireless communication environment 100 transmit a WPT broadcast.

After step 604, the flowchart 600 transitions to step 606, where the wireless communication device 120 notifies, upon receipt of the WPT broadcast, the wireless communication device 110 of its intention to enter the WPT mode by transmitting a WPT mode notification to the wireless communication devices 110.

After step 606, the flowchart 600 transitions to step 608, where the wireless communication device 110, upon receipt of the WPT mode notification, modifies its transmission output power. For example, the wireless communication device 110 may increase the transmission output power such that the wirelessly communicated information (i.e., radiative power) has a higher power during the WPT mode.

After step 608, the flowchart 600 transitions to step 610, where the wireless communication device 110 operates in a WPT mode and transmits wireless communicated information (i.e., radiative power) to the wireless communication device 120.

After step 610, the flowchart 600 transitions to step 612, where the wireless communication device 110 stops operating in a WPT mode.

After step 612, the flowchart 600 transitions to step 614, where the wireless communication device 120 stops operating in a WPT mode.

After step 614, the flowchart 600 transitions to step 616, where the flowchart 600 ends.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

The Detailed Description of the exemplary embodiments has revealed the general nature of the present disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the present disclosure. Thus, the invention should not be limited by any of the above-described exemplary embodiments, but should be defined only in accordance with the following claims and their equivalents.

What is claimed is:

1. A wireless communication device, comprising
   a communication transceiver configured to wirelessly transmit and/or receive communications to and/or from at least one other wireless communication device; and
   a controller, coupled to the communication transceiver, configured to:
      control entry of the wireless communication device into a communication mode and a wireless power transfer (WPT) mode based on a predetermined sequence,
      determine, based on a current charge of a battery, a frequency and a duration that the wireless communication device should operate in the WPT mode, and
      adjust the predetermined sequence based on the determined frequency and duration that the wireless communication device should operate in the WPT mode.

2. The wireless communication device of claim 1, wherein the communication transceiver is configured to wirelessly transmit and/or receive the communications to and/or from the at least one other wireless communication device via an antenna during the communication mode.

3. The wireless communication device of claim 2, further comprising:
   a radiative power harvester configured to:
      receive radiative power transmissions from the at least one other wireless communication device via the antenna during the WPT mode, and
      convert the received radiative power transmissions to a charge, the charge capable of charging the battery.

4. The wireless communication device of claim 3, further comprising:
   a switching unit configured to selectively connect the antenna to one of the communication transceiver or the radiative power harvester.

5. The wireless communication device of claim 4, wherein the switching unit connects the antenna to the communication transceiver during the communication mode and connects the antenna to the radiative power harvester during the WPT mode.

6. The wireless communication device of claim 4, wherein the controller is further configured to:
   control the selective connection of the antenna to the communication transceiver or the radiative power harvester by the switching unit.

7. The wireless communication device of claim 4, wherein the predetermined sequence establishes a transmission power at which the radiative power transmissions are transmitted.

8. The wireless communication device of claim 1, wherein the communications transmitted from the wireless communication device to the at least one other wireless communication device include a notification indicative of entry into the WPT mode by the wireless communication device, wherein the notification includes at least one time of entry into the WPT mode and at least one corresponding duration of operation in the WPT mode.

9. The wireless communication device of claim 1, wherein the controller is further configured to:
   determine the frequency and the duration that the wireless communication device should operate in the WPT mode based on the current charge of the battery and an operating condition of the wireless communication device.

10. The wireless communication device of claim 1, wherein the controller is further configured to:
   determine the frequency and the duration that the wireless communication device should operate in the WPT mode based on the current charge of the battery and a plurality of operating conditions of the wireless communication device, wherein the plurality of operating conditions of the wireless communication device include a quality of service (QoS) of the wireless communication device and remaining ampere-hours (Ah) of the battery.

11. The wireless communication device of claim 1, wherein the controller is further configured to:
adjust the predetermined sequence in response to detecting a change in a connectivity status of an alternative power source.

12. A wireless communication device, comprising:
a switching unit configured to selectively connect an antenna to one of a communication transceiver or a radiative power harvester; and
a controller, coupled to the switching unit, configured to:
   determine, based on a current charge of a battery, a frequency and a duration that the wireless communication device should operate in a wireless power transfer (WPT) mode, and
   adjust a rate at which a switching unit selectively connects the antenna based on the determined duration that the wireless communication device should operate in the WPT mode.

13. The wireless communication device of claim 12, wherein:
the communication transceiver is configured to wirelessly transmit and/or receive communications to and/or from a second wireless communication device via the antenna during a communication mode.

14. The wireless communication device of claim 13, wherein the switching unit connects the antenna to the communication transceiver during the communication mode and connects the antenna to the radiative power harvester during the WPT mode.

15. A method, to wirelessly receive power at a first wireless communication device from a second wireless communication device, the method comprising:
negotiating with the second wireless communication device to establish a wireless power transfer (WPT) sequence in which the first and second wireless communication devices operate in a WPT mode;
determining, at the first wireless communication device, a frequency and a duration that the first wireless communication device should operate in the WPT mode based on a current charge of a battery; and
adjusting, at the first wireless communication device, the WPT sequence based on the determined duration that the first wireless communication device should operate in the WPT mode.

16. The method of claim 15, further comprising:
switching from a communication mode to the WPT mode based on the WPT sequence.

17. The method of claim 16, wherein the switching from the communication mode to the WPT mode comprises:
disconnecting an antenna connected to a communication transceiver of the first wireless communication device; and
connecting the antenna to a radiative power harvester of the first wireless communication device.

18. The method of claim 17, further comprising:
receiving, by the radiative power harvester, a transmission from the second wireless communication device;
converting, by the radiative power harvester, the received transmission to a charge; and
storing the charge converted from the received transmission in the battery.

19. The method of claim 18, wherein at least one of:
the transmission received by the radiative power harvester is transmitted at a first frequency and a transmission received by the communication transceiver is transmitted at a second frequency different from the first frequency; and
the transmission received by the radiative power harvester is transmitted at a first transmission power and the transmission received by the communication transceiver is transmitted at a second transmission power different from the first transmission power.

20. The method of claim 15, wherein the WPT sequence includes at least one of:
a transmission output power of a transmission to be received by the first wireless communication device;
a transmission frequency of the transmission to be received by the first wireless communication device; and
at least one time period in which the first and second wireless communication devices are to operate in the WPT mode.

* * * * *